United States Patent [19]

Morshäuser et al.

[11] Patent Number: 5,531,005
[45] Date of Patent: Jul. 2, 1996

[54] DEVICE FOR FIXED POSITIONING OF A PALLET ON A WORK TABLE

[75] Inventors: George Morshäuser, Nesselwang; Alfred Geissler, Pfronten, both of Germany

[73] Assignee: Deckel Maho GmbH, Germany

[21] Appl. No.: 310,272

[22] Filed: Sep. 21, 1994

[30] Foreign Application Priority Data

Sep. 24, 1993 [DE] Germany .............. 9314483 U

[51] Int. Cl.⁶ .................................. B23Q 7/00
[52] U.S. Cl. .................... 29/33 P; 198/345.3; 198/346.1
[58] Field of Search ................. 29/33 P; 409/219; 198/345.3, 346.1, 465.1; 414/744.3; 294/815

[56] References Cited

U.S. PATENT DOCUMENTS 5,189,774  3/1993  Hofmann .................. 29/33 P

FOREIGN PATENT DOCUMENTS

0521316A1  1/1993  European Pat. Off. .

3923574C1  10/1990  Germany .
83553  6/1980  Japan ...................... 198/345.3
105855  5/1988  Japan ...................... 198/346.1

*Primary Examiner*—William Briggs
*Attorney, Agent, or Firm*—Lawrence A. Maxham; Baker, Maxham, Jester & Meador

[57] ABSTRACT

A device for positioning a pallet on a work table. The device consists of a vertically movable pallet carrier for transport and for raising and lowering a pallet that is provided with clamping elements on the lower side and at least one clamping device that is provided in the work table. The clamping device can be actuated by vertical movements of the pallet carrier. It has at least one wedge-type valve for clamping a clamping element on the pallet that has been deposited. The clamping device also has at least one control element that can be operated by the pallet carrier for releasing the clamp against the force of the springs, where the control element is mounted directly on one of the wedge-type valves.

5 Claims, 1 Drawing Sheet

DEVICE FOR FIXED POSITIONING OF A PALLET ON A WORK TABLE

BACKGROUND

1. Field of the Invention

This invention concerns a device for fixed positioning of a pallet on a work table.

2. Discussion of the Prior Art

German patent 3,923,574 discloses a device for changing pallets where a pallet changer is arranged in front of the work table that belongs with the machine. It has a motor-driven pallet carrier that can be raised and lowered and rotated about its vertical axis for replacing a pallet on the work table with a pallet in a holding position. The pallet is secured on the work table by means of several studs that are provided on each pallet and are secured in the work table by means of a hydraulic clamping unit. One disadvantage of this device is that a separate hydraulic drive is needed for operation of the pallet clamping device. The pallet changing drive and the hydraulic drive of the clamping device must be controlled separately and must be coordinated in a suitable manner. Therefore, a complex control system is necessary for the actuation and adjustment of the two separate drives.

Another device for automatic changing of pallets is disclosed in European patent application 521,316. That structure permits automatic and accurate positioning of the workpiece pallet on the pallet carrier. With this device, the clamping mechanism has two puller and pusher mechanisms that are under a pre-tension with respect to each other by means of compression springs and have wedges on their facing sides. The bolts attached to the lower side of each pallet have lateral key grooves in which the wedges of the two puller and pusher mechanisms engage so they lock together. At least one of the puller and pusher mechanisms has a lateral recess in which a control element engages. Several shafts are mounted in the pallet carrier and each shaft has a control element at one end and can be rotated by the vertically movable pallet carrier by means of an actuating element at the other end. The vertical movement of the pallet changer is converted by mechanical actuating and control elements into a horizontal movement of the puller and pusher mechanisms to lock and release the pallet engaging clamps. Thus, no separate drive is needed to operate the pallet clamping device and the corresponding control elements can also be eliminated. However, a disadvantage of the known device is the relatively complicated design due to the fact that two shafts each having their own actuating and control elements must be provided.

SUMMARY OF THE INVENTION

A primary purpose of the present invention is to improve the functional reliability of a clamping mechanism provided with a generic positioning device for pallets and also to simplify the design of this mechanism. This purpose is achieved by the fact that the control element for releasing wedge-type valves is attached directly to one of the wedge-type valves and projects into the path of movement of the pallet carrier.

Due to the arrangement of the control element according to this invention, which is directly on the end or on one side of the wedge-type valve, when there is a vertical movement of the pallet carrier, a tapered slide is shifted longitudinally directly against the spring force without requiring the translation of the vertical movement of the pallet carrier into a rotational movement of the shafts as is necessary in the known prior art. This greatly reduces the cost of the design.

According to an especially expedient embodiment of this invention for engaging several clamping elements on a pallet at the same time, the wedge-type valve having the control element is connected to a second wedge-type valve by means of a connecting rod and at least one spring. The connecting rod is guided so it can slide in one of the two wedge-type valves and can be connected to this wedge-type valve in a positive manner by means of another spring. This design permits simultaneous operation of the two separately spring-loaded wedge-type valves by means of just a single control element, which assures an especially reliable and accurate means of securing the pallet on the work table. In addition to these advantages, the clamping device of this invention is also of relatively simple construction.

BRIEF DESCRIPTION OF THE DRAWING

The objects, advantages and features of the invention will be more readily perceived from the following detailed description, when read in conjunction with the accompanying drawing, in which.

DETAILED DESCRIPTION OF THE PREFERRED EMBODIMENTS

Figure 1:
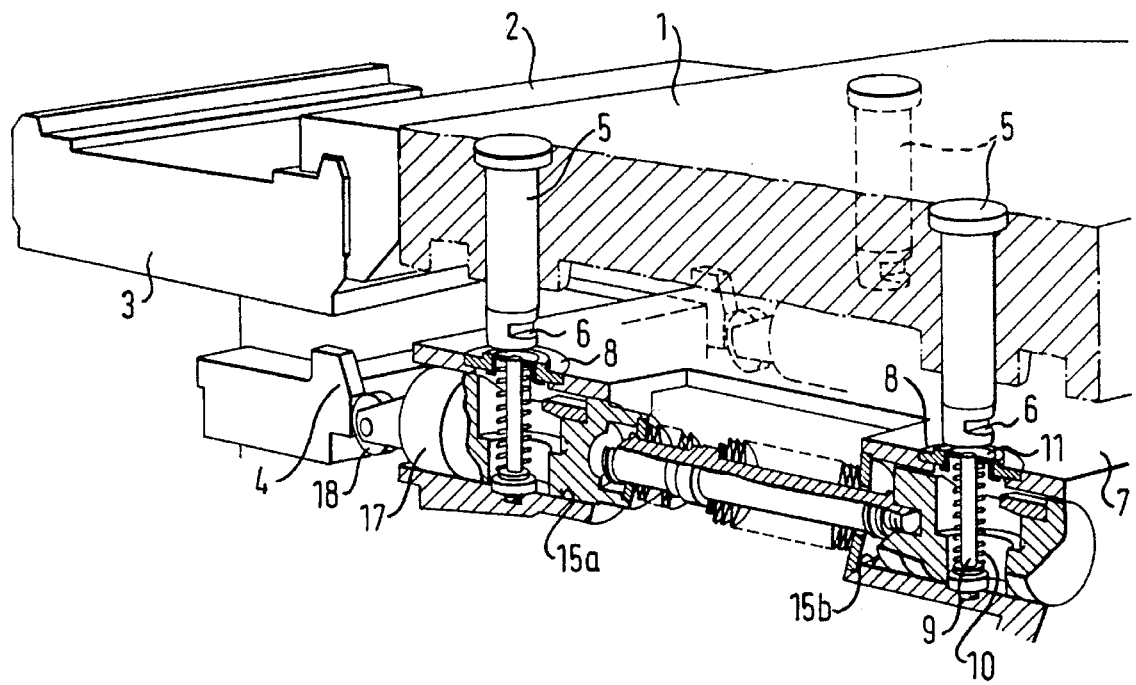
FIG. 1 illustrates a positioning device constructed in accordance with the invention which is built into a work table before a pallet is deposited on the table.

According to FIG. 1, pallet 1 is detachably held on pallet carrier 3, which is known from German patent 3,923,574, for example, by means of hook-shaped carrying element 2 that is attached to the side walls of the pallet. Pallet carrier 3 can be rotated about a vertical axis and can execute vertical raising and lowering movements. Actuating cam 4 that projects at the side and has a sloping edge is mounted on the pallet carrier. Several bolts 5, each of which has key groove 6 on the side of the projecting lower end section, are provided in pallet 1.

Receptacles 8 for each of bolts 5 are provided in work table 7 which is designed, for example, as a work table for a machine tool (not shown). Mounted in each receptacle 8 is pin 9 and spring 10 which has cover 11 at its top end. Two wedge-type valves 12, 13 (FIG. 2) are arranged in horizontal recess 15a, 15b in work table 7 in such a way that they can slide longitudinally. These wedge-type valves each have transverse vertical recesses to receive one bolt each as well as holding one horizontal clamping wedge 14. Spacer 17 which has projecting roller 18 as a control element mounted on it is provided at the end of the clamping device shown at the left in FIGS. 1 and 2.

Plate 19 is mounted on the right end of the left clamping device and has one end of rod 20 guided in a central opening in such a way that the rod can move longitudinally. First compression spring 21 is supported on this disk 19 and the other end of this spring rests against ring collar 22 on rod 20. Second spring 23 is clamped between this ring collar 22 and disk 24 through which the right end part of rod 20 passes. This disk 24 is secured to work table 7. The right end of rod 20 is screwed into wedge-type valve 13.

Figure 2:
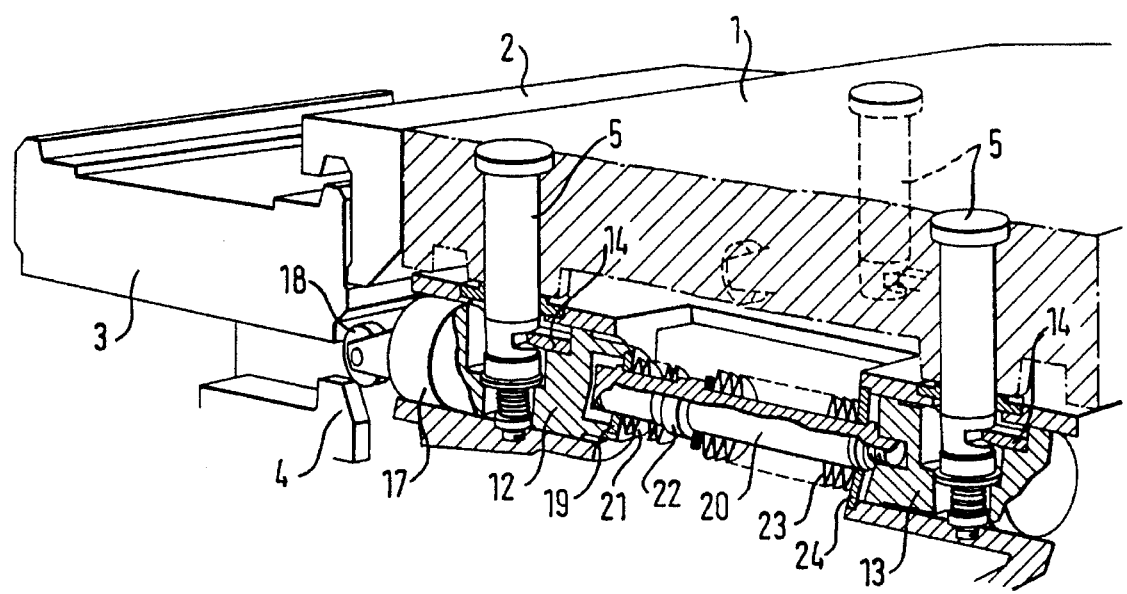
FIG. 2 depicts the positioning device of FIG. 1 with the pallet secured in position.

The functioning of the positioning device according to this invention can be explained by considering FIGS. 1 and 2 together. When pallet carrier 3 is lowered from the raised position shown in FIG. 1 to the deposited position shown in FIG. 2, bolts 5 enter receptacles 8 in work table 7, where cover 11 is depressed by the weight of the pallet against the force of spring 10 and pins 9 enter a corresponding longitudinal borehole in bolts 5. The slope on actuating cam 4 is positioned in such a way that roller 18 rolls on it even at the start of a lowering movement of pallet carrier 3 in such a way that spacer 17, together with the two clamping devices 12 and 13, moves out of the release position according to FIG. 1 into the clamped position according to FIG. 2 as soon as pallet 1 rests on work table 7 and side key grooves 6 of the bolts are in the clamping position.

In the embodiment illustrated here, the two wedges 14 are engaged simultaneously in the respective key grooves 6 in bolts 5 due to the functional coupling of the two wedge-type valves 12, 13 by means of rod 20 and the two compression springs 21 and 23. In the clamping operation, the wedge-type valve 13 is moved toward the left into its clamped position by spring 23 that is clamped between ring collar 22 and disk 24 which is secured in position, while the wedge-type valve 12 on the left enters its engaged position due to the force of the two springs 21 and 23.

In view of the above description it is possible that modifications and improvements will occur to those skilled in this technical field which are within the scope of the appended claims. For example, roller 18 that forms the control element may be mounted on the side instead of on the end of the slide valve, in which case cam 4 will have a sloping surface that is designed accordingly. In addition, more than two bolts may also be secured by the clamping device illustrated in FIGS. 1 and 2.

What is claimed is:

1. A device for fixed positioning of a pallet on a work table, and said device comprising:

a vertically movable pallet carrier for transport and for raising and lowering the pallet, said pallet being equipped with clamping elements on its lower side;

at least one clamping device mounted in the work table, said clamping device being actuatable by vertical movements of said pallet carrier, said clamping device having at least one wedge-type valve for clamping one of said clamping elements of said pallet after said pallet has been deposited; and at least one control element that is actuatable by said pallet carrier for releasing said clamping elements against a spring force;

wherein said control element is mounted directly on one of said wedge-type valves.

2. The device recited in claim 1, wherein said wedge-type valve which carries said control element is connected by a connecting rod and at least one spring to at least one second wedge-type valve in order to permit simultaneous clamping of several said clamping elements.

3. The device recited in claim 2, wherein said connecting rod is guided in one of said wedge-type valves and is connected to said wedge-type valve in a positive manner by means of said spring.

4. The device recited in claim 2, wherein one end of a second spring whose other end rests against a stationary stop is attached to said connecting rod.

5. The device recited in claim 3, wherein one end of a second spring whose other end rests against a stationary stop is attached to said connecting rod.

* * * * *